United States Patent [19]
Sarachik

[11] Patent Number: 6,078,700
[45] Date of Patent: Jun. 20, 2000

[54] METHOD AND APPARATUS FOR LOCATION AND INSPECTING A TWO-DIMENSIONAL IMAGE INCLUDING CO-LINEAR FEATURES

[76] Inventor: Karen B. Sarachik, 472 Walnut St., Newton, Mass. 02160

[21] Appl. No.: 08/816,279

[22] Filed: Mar. 13, 1997

[51] Int. Cl.[7] .................................................. G06K 9/36
[52] U.S. Cl. ........................................ 382/291; 382/190
[58] Field of Search .................................. 382/145, 147, 382/291, 190; 348/87

[56] References Cited

U.S. PATENT DOCUMENTS

| | | | |
|---|---|---|---|
| 5,144,685 | 9/1992 | Naser et al. | 382/153 |
| 5,694,482 | 12/1997 | Maali et al. | 348/87 |

OTHER PUBLICATIONS

D.W. Jacobs, *The Use of Grouping in Visual Object Recognition*, MIT Artificial Intelligence Laboratory, Office of Naval Research, pp. 1–162, Oct. 1988.

D.G. Lowe, *Object Recognition by Computer: The Role of Geometric Constraints*, The MIT Press, pp. 449–454, 1990.

F. Groen, et al., *Symbol Recognition in Electrical diagrams using probabilistic Graph Matching*, Elsevier Science Publishers, pp. 343 and 349, 1985.

J. Cooper, et al., *Early Jump–Out Corner Detectors*, Transactions on Pattern Analysis and Machine Intelligence, vol. 15, No. 8, Aug. 1993.

*Primary Examiner*—Leo H. Boudreau
*Assistant Examiner*—Gregory Desire
*Attorney, Agent, or Firm*—Brian Michaelis

[57] ABSTRACT

A method and apparatus optimizes the process of locating an image of a part by exploiting at least one set of regular co-linear features in the image of the part. A selected one of the at least one set of regular co-linear features is used to quickly correlate a set of image points and a set of model points which are likely to correspond to each other. A one to one correspondence of a subset of model points to a subset of image points yields a single possible location for the part in the image, which location can be quickly and reliably checked for correctness, and if incorrect, a next possible set to set correspondence can be tested until the correct location is found.

25 Claims, 5 Drawing Sheets

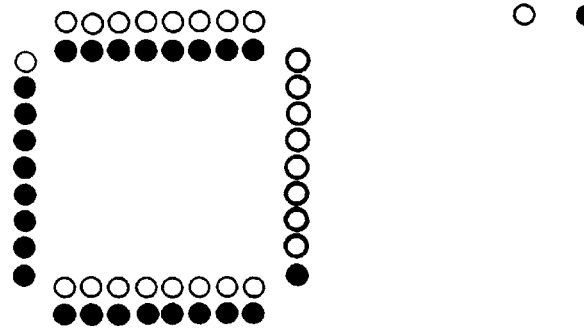
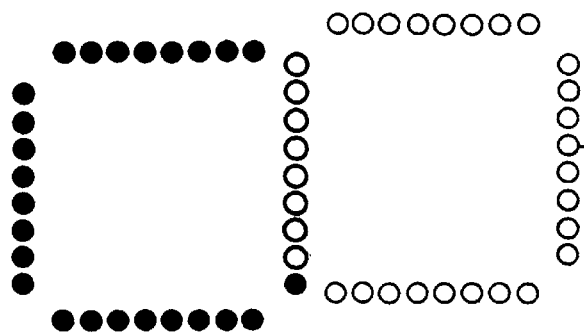
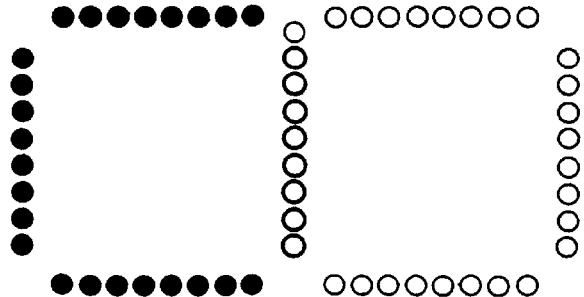

METHOD AND APPARATUS FOR LOCATION AND INSPECTING A TWO-DIMENSIONAL IMAGE INCLUDING CO-LINEAR FEATURES

FIELD OF THE INVENTION

The present invention relates to machine vision systems, and more particularly to a method and apparatus for performing automated visual location and inspection.

BACKGROUND OF THE INVENTION

Machine vision systems are frequently used in contexts that require the system to capture a two dimensional image of a physical object and locate within that image some aspects or features that are to be analyzed, such as to determine position of the features to effect alignment or a particular orientation.

Known systems employ what may be referred to as "feature based" methods for locating features within a captured image of the object. The physical object or entity being manipulated or inspected, e.g. a circuit board or component, is manipulated or inspected in "physical space", which is an absolute coordinate frame within which the object actually resides. A typical application for such systems employing feature based methods is to determine a current position and/or effect alignment of the physical object in physical space based on a model of the object.

Implementation of feature based methods typically requires as an input to the vision system a set of model features acquired from the model (i.e. standard of the physical object), in accordance with an arbitrary coordinate system or "model space". An image of the physical entity is acquired by the vision system in accordance with an "image space" coordinate system, in order to input to the vision system a set of image features (analogous to physical features). The image is typically input as point information relative to the image space coordinate system. Knowing the two dimensional linear mapping between physical space and image space, the set of model features and the set of image features can be processed according to known algorithms to determine "correspondence", i.e. a direct mapping of respective two dimensional spatial relationships, between model features and image features. Correspondence between model and image features, or equivalently, a two dimensional rigid transform that maps model features to their corresponding features in image space can then be used, knowing the two dimensional linear mapping between physical space and image space, to determine the spatial relationship between model space and physical space in order to position/align features of the object in physical space in accordance with model features in model space.

Known algorithms or approaches for searching for correspondence between model features and image features include: an interpretation tree approach; a minimal basis set approach; and a grouping approach, all of which are generally described in OBJECT RECOGNITION BY COMPUTER: THE ROLE OF GEOMETRIC CONSTRAINTS, Grimson, W. E. L., The MIT Press, 1990, which is incorporated herein by reference.

In the interpretation tree approach, all possible correspondences between model and image features are tested. The interpretation tree approach can be illustrated by letting "M" stand for a model feature, "I" stand for an image feature, "m" be the number of model features and "i" be the number of image features. Assuming that every model feature appears somewhere in the image, all model features are ordered from 1 to m, and then matched to all sequences of the form $I_1 I_2 \ldots$ m. For the first position in the( sequence there are i possible choices of image features, for the second there are (i-1), and so on. Therefore, the number of possible sequences to test is on the order of $i^m$, that is, the number of possible combinations of model features and image features that must be checked for correspondence is exponential.

Although impossible combinations of matches can be identified and pruned out in effecting the interpretation tree approach, the search space is still exponentially large. A clear disadvantage of this approach is that it is very time consuming to process all potential correspondences if either i or m is greater than a very small number of features. Thus, the amount of processing overhead required to effect this approach is likely to be quite significant. Furthermore, large amounts of memory may be required if it is necessary to store all possible combinations of model features and image features that must be checked for correspondence.

In the minimal basis set approach there is no need to check all possible combinations of model features for correspondence with image features in an image. This approach takes advantage of the fact that a correspondence of only two model to two image features is required to solve for a two dimensional (2D) rigid transform defining the relationship between model space and image space. Therefore, two model features, $M_1$ and $M_2$, are matched against every image feature subset comprised of two features. When two image features are found to correspond to the model features, the correspondence is used to solve for a 2D rigid transform which directly maps image space to model space. The resultant transform is then used to project any remaining model points into the image. Projecting a model point into an image means solving for a hypothesized location of a feature within an image (in image space) based on the 2D transform mapping model space to image space. An image feature is searched which corresponds to each projected model point. Image features are found to correspond to model points if they are close in terms of their respective locations, i.e. if the image feature and model feature locations match. The entire set of image to model feature correspondences is used for the final fit between image and model features.

Disadvantageously, the minimal basis set approach is highly sensitive to noise in the image. Any noise in the location of the image features used in the original correspondence may lead to erroneous correspondence of the remaining model features. Significant levels of noise, such as might be introduced into a vision system by lighting problems, optics problems, etc., may result in a correct full correspondence being missed completely.

The grouping technique for searching for correspondence between model features and image features involves using a small, selected subset of image features. The image features selected for determining correspondence with model features are ones that are most likely to belong to a subset of a set of features comprising the model. For example, a vision system might be implemented in an application wherein it is desirable to find a particular rectangular object in the scene or image, e.g. a microchip. Although the captured image contains many objects, grouping could be applied by having the vision system select all groups of line segments from the image, and more particularly all groups of line segments that are at right angles to each other. The subsets or smaller groups of features, e.g. line segments at right angles to each other, would then be used to match to the chip model, rather than using the entire set of line segments.

Although the concept of grouping has potential to reduce the overall search space and overhead associated with achieving correspondence between model features and image features, practical implementations embodied in vision systems known in the art suffer significant drawbacks. A known system implementing grouping is referred to as GROPER and is described in detail in THE USE OF GROUPING IN VISUAL OBJECT RECOGNITION, Jacobs, D. W. (Doctoral Thesis, Massachusetts Institute of Technology, 1988). The grouping approach implemented in GROPER effects object recognition by grouping image characteristics which are believed likely to match a subset of model (candidate) characteristics. GROPER implements a grouping process that searches a captured, run-time image for subsets of features to match against groups of model candidate characteristics indexed in a precomputed lookup table. The image characteristics grouped and the model candidate characteristics stored in the lookup table in the GROPER system are edges. The lookup table is built using multiple candidate models and contains all pairs or subsets of edges from all models. The image characteristics searched for, which are believed likely to match a subset of model (candidate) characteristics, are used for looking up all possible matching model subsets. That is, at runtime, the GROPER object recognition system seeks to identify in an image a subset of edges corresponding to a subset in a single model, and if some subset of features is identified that may match a subset of model features, it is processed against the lookup table to determine a possible match.

The grouping implementation(s) known in the art are not suitable for implementation in many applications. Such grouping implementations present difficulties in any context where there are repetitive patterns that create a large number of potential matches, in that a lookup table can disadvantageously require a large number of entries. Creating and traversing the lookup table can represent a significant amount of processing. Lookup table traversal may yield a large number of false matches. In systems such as GROPER, where a large number of candidate model characteristics must be considered for a potential match, verification of the match can be very slow.

SUMMARY OF THE INVENTION

The present invention provides a method and apparatus that optimizes the process of locating an object in an image wherein the object contains at least one set of regular co-linear features. A selected set of the at least one set of regular co-linear features is used to quickly correlate a set of image points and a set of model points which are likely to correspond to each other. A one-to-one correspondence of a plurality of model points to a plurality of image points yields a single possible location for the object in the image, based on the image set to model set correspondence. The single possible location can be quickly and reliably checked for correctness, and if incorrect, a next possible set to set correspondence can be tested until the correct location is found with limited processing of feature information.

According to the invention, a model is preprocessed to determine all sets of co-linear model features. An image feature finder, tailored or selected to find the specific type of features, is implemented to extract point information relating to features in the image. A co-linear feature finding process is configured to find regularly spaced co-linear image features by identifying all groups of three points that may constitute a line. Each group of three points is tested for co-linearity and frequency, where the frequency or spacing between points is determined by the geometry of the model being matched. A line is established when a grouping of three points is found to meet the co-linearity and frequency criteria. Then, all other image features are tested for membership in this established line (again, membership is based on co-linearity and frequency). When a line is identified in the image that has the requisite number of image features, i.e. set size, where the exact number or set size is determined by the model object geometry, the image line feature position information from all the points currently belonging to the line is passed to a position hypothesis generator.

The position hypothesis generator processes the image line feature information (i.e. a set of image features), and the preprocessed model information (i.e. a plurality of sets of model features), to determine one-to-one correspondence between each feature in the image line (the set of image features) and each feature in a model line selected from all sets of co-linear model features (the plurality of sets of model features) identified in preprocessing. The image line feature information is iteratively tested against all possible model sets (i.e. lines of features) that it might match in the plurality of co-linear sets or lines of model features. One-to-one correspondence is tested between each feature in the image line and each feature in each set of model features. One-to-one correspondence indicates that each feature of the set of cc-linear features from the image (in image space) corresponds tc (i.e. is spatially correlated to or aligned with) each feature of a set of co-linear features in the model (in model space).

A two dimensional rigid transform is generated based on individual correspondences of features comprising the set of image features and the sets of model features. The two dimensional rigid transforms (one for each one-to-one correspondence between the image line features and features of a respective one of the plurality of model sets) are used to project into the image set any remaining model points that do not have correspondence (i.e. points from other sets that should be part of the image), and to map the model feature set to the image feature set, effecting a respective hypothesized position image for each set correspondence. Each hypothesized position image is passed to a verification process which tests the hypothesized position image against the captured image to see if it is a correct hypothesis, i.e. if all of the image features are present and in their proper locations.

An optional position refinement or update is effected on the image sets of the hypothesized position image having all of the features present and in the correct position. This optional position refinement ensures the best possible positioning of the object/component based on the acquired image information by minimizing the effects of noise in the image.

Features of the invention include provision of a high speed mechanism for determining positioning and inspecting an object in two dimensions. The approach according to the invention is not highly sensitive to noise in the image. System overhead and storage requirements are minimized as a limited number of model features are stored for processing. An enhanced positioning mechanism is provided for electronic devices having regular co-linear features, such as leads, that can be processed without requiring a lookup table. Positioning of a component in two dimensions can be accurately determined based on a model and further refined based on actual information derived from the image of the component in order to overcome deviation between model parameters and actual component characteristics.

BRIEF DESCRIPTION OF THE DRAWING

The foregoing and other features and advantages of the present invention will b)e more fully understood from the following detailed description of illustrative embodiments, taken in conjunction with the accompanying drawing in which:

FIGS. 6(a)–6(d) are illustrations of image hypotheses related to the position hypotheses of FIG. 5 and used in verification testing in the method and apparatus of FIG. 1.

DETAILED DESCRIPTION

The present method and apparatus for inspecting and locating within an image a two dimensional model containing co-linear features, is illustratively implemented in the context of electronic component handling systems. In fabricating electronic assemblies, components having a plurality of leads or terminals, such as surface mount devices, must be accurately positioned on corresponding solder pads on a printed circuit board. The leads or terminals are often fine pitch, i.e. closely spaced and are co-linear or substantially linearly disposed with respect to one another, i.e. in a line. There is little margin for error in positioning such devices on the board during assembly.

Pick and place machines are used to manipulate the electronic components into position on the electronic circuit boards for automated assembly. Pick and place machinery typically comprises a robotic mounter configured to handle electronic components (e.g. integrated circuits, capacitors, large leaded devices, etc.). The robotic mounter is integrated with a vision system which acquires information related to the component as it is handled by the mounter. Generally, the mounter includes an arm or nozzle that picks up the electronic component(s) from a feeder for placement on the printed circuit board at a designated location. As it is placing each component, the arm passes the component over a camera and an image of the component is acquired for the vision system. The vision system is configured to provide feedback to the robotic mounter as to the exact position of the component on the mounter nozzle, so that the mounter can perform fine positional adjustments before placing the component on the board.

The components handled by pick and place machines typically have a plurality of features that must be aligned, and some subset of those features, such as the leads or interconnects, are co-linear features that can be used to find correspondence according to the invention to facilitate the positioning process. The vision system in this illustrative embodiment, such as a Cognex 5000 Series vision system and vision tools known in the art, is implemented to locate the regular co-linear features, or a subset of the co-linear features, in a two dimensional image of the component that is captured, as known in the art, when the component is passed over image acquisition components of the vision system. The regular co-linear features, or a subset of the co-linear features are used, according to the invention as generally illustrated in FIG. 1, in determining positional adjustments for properly positioning the component on the printed circuit board.

Figure 1:
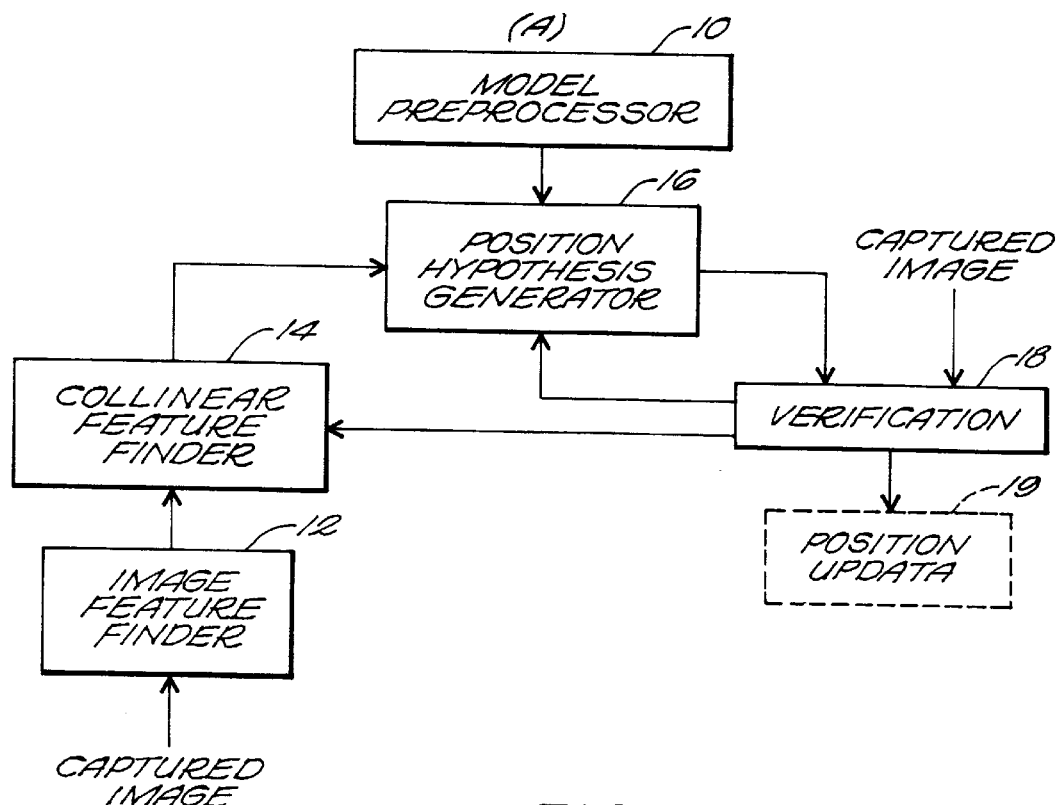
FIG. 1 is ai block diagrammatic representation of a method and apparatus for locating and inspecting a two dimensional image according to the invention.

As illustrated in FIG. 1, prior to undertaking any run-time processing of the particular components being manipulated, the vision system must be trained, as known in the art, to effect model preprocessing 10. Training or preprocessing 10 is handled "off-line", i.e. prior to any assembly run, and in this application for locating co-linear features in a two dimensional image basically involves constructing a data structure representing a model of the component(s) to be processed. The model data structure, representing a model component in model space, includes characteristics of a known good or standard component. In a preferred implementation the model characteristics are derived from geometric component definitions describing the features of interest. The geometric description can be input to the system as a synthesized file of ideal component characteristics provided by the component vendor, or they can be empirically derived and entered such as by manually measuring the component characteristics of interest to provide a synthesized ideal model.

Figure 2:
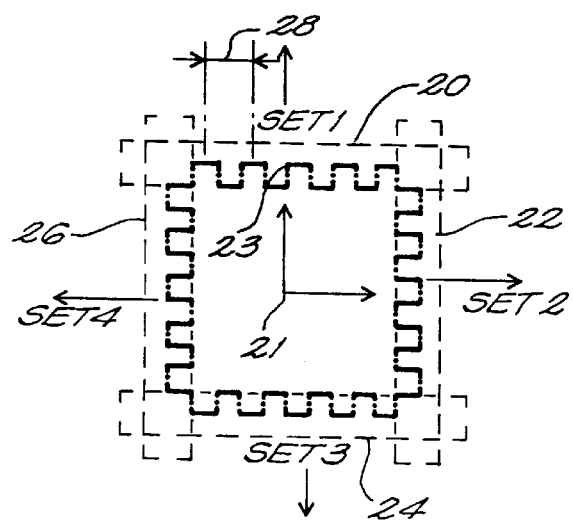
FIG. 2 is a diagram of co-linear feature sets in a two dimensional model, such as would be present in a model of an electronic component.

For each component comprising a set or plurality of sets of co-linear features 20, 22, 24, 26, such as illustrated in FIG. 2, a data structure is constructed during preprocessing including a unique identifier for the respective set of co-linear features, and characteristics of the features belonging to the set. The characteristics of interest, relating to and stored in association with each uniquely identified set of co-linear features, include a number of the features (i.e. cardinality of leads or terminals) associated with the set, a pitch or spacing 28 between contiguous features (typically in microns), and a location or position of the identified set with respect to a device or model reference frame 21. The location or position information stored in the model data structure is a two dimensional transform relating the model reference frame 21 and a set reference frame 23. The position transform includes an X translation coordinate, a Y translation coordinate, and a rotation angle between the X axes of the reference frames 23, 21. The model is preprocessed in this illustrative embodiment to construct the data structure identifying all sets of co-linear model features and their respective characteristics based on sets of co-linear leads. Each set's reference is at the center of the lead set and the Y-axis of the reference frame radiates outwardly from the center of the part, while the X-axis lies along the lead set.

With the model feature set characteristics stored, an image feature finder 12 (FIG. 1) is implemented to find the features, in image space, in the captured image of the part during run-time. The image feature finder is selected to optimally find features correlated, i.e. similar in character, to the features defined in the data structure input during preprocessing 10. The image feature finder is a standard vision tool, such as Cognex Blob Tool or Search Tool as known in the art, which extracts point information, i.e. coordinate information (in accordance with image space), related to the features in the captured image.

Figure 3:
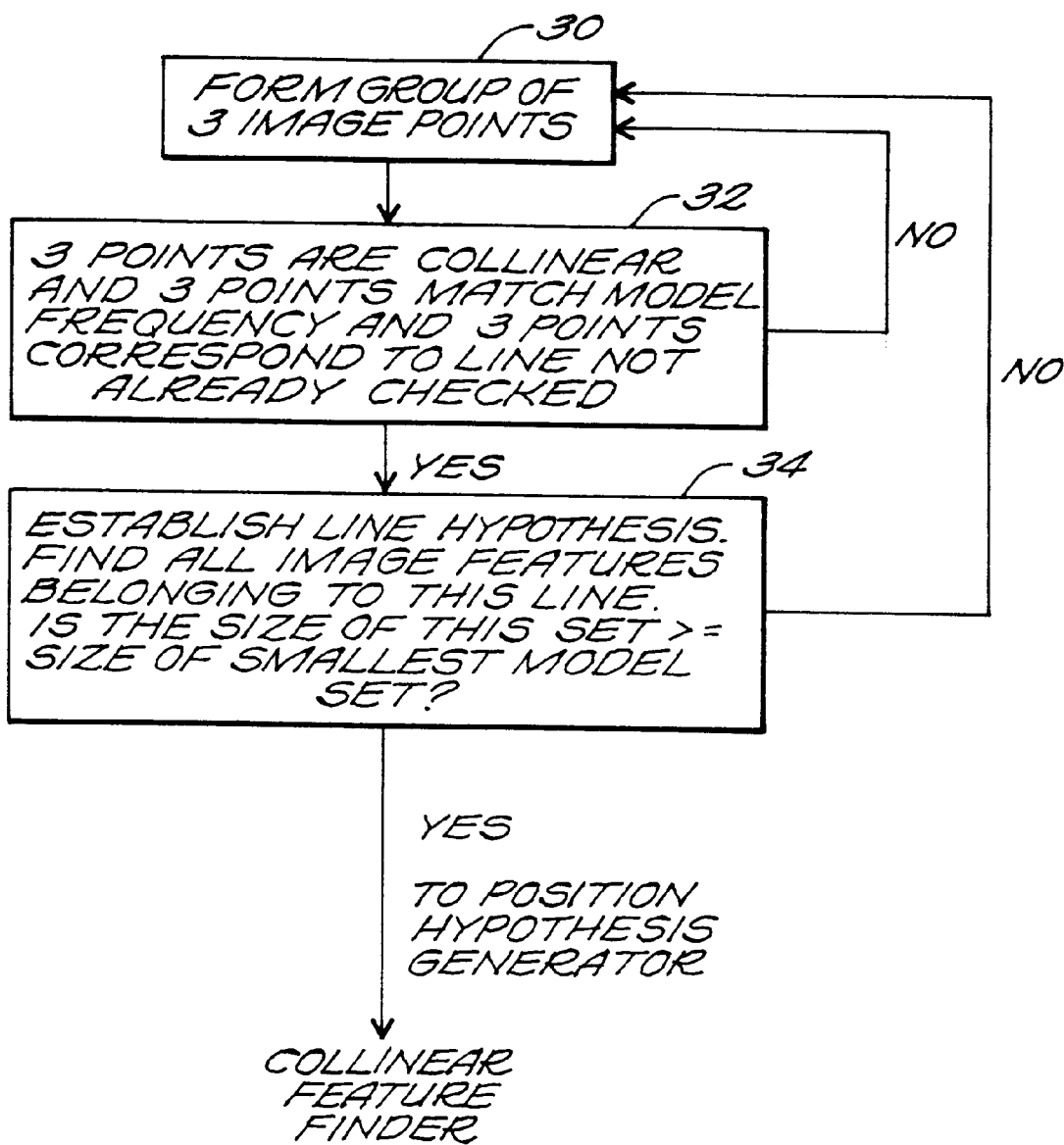
FIG. 3 is a block diagram of a co-linear feature finder process of the method and apparatus of FIG. 1.

A co-linear feature finder module 14 is implemented to receive from the image feature finder 12 the point information related to the captured image and to find regularly spaced co-linear image features therein. The co-linear feature finder 14, illustrated in greater detail in FIG. 3, is configured to find all groups of three points or features 30. The groups are formed by executing an exhaustive loop which forms groups of three using all of the features.

All of the groups of three features are then processed to determine whether they meet co-linearity and frequency (i.e.

spacing) criteria 32, which criteria are based on the model features of interest. Each group of three features is tested for co-linearity, where co-linearity is defined as a least squared line between the three points wherein the maximum deviation permissible for the point to fit the line is a function of the dimension of the feature(s) of interest. For instance, in this illustrative embodiment where the co-linear feature of interest is a component lead, the maximum deviation permissible for the point to fit the line is a selected fraction of the lead length. The fraction selected for the maximum deviation is selected such that if the point or features/lead was to deviate maximally in either direction perpendicular from the line, the lead/feature would still have sufficient contact with the a respective pad with which it is being aligned.

Likewise, frequency, i.e. spacing between the features, is determined by the geometry of the model being matched. The limit of frequency or spacing for a feature (or apparent feature) to fall within a line is a function of the number of features in a set and the spacing therebetween. Each of the three points in a group must be some integer multiple of the fixed space between a pair of contiguous model features. Further, no one of the three points can exceed a maximum distance away from any other point in the set, the maximum distance that can not be exceeded being equal to the total number of features in the set times the space between contiguous points. For example, if the model has ten features spaced 2 millimeters apart, then the three image points must each be within an integer multiple of two millimeters away from each other (subject to some tolerance), and no two image features in the group may be more than (10−1)*2 millimeters away from each other.

Both the co-linearity and frequency criteria are subject to tolerances that permit a feature to be within some acceptable two dimensional area of points associated with a model feature on a model line. The acceptable area is a function of the nature of the feature and the particular application. For instance, in configuring a pick and place machine according to the invention in an application wherein leads on a device are being aligned for placement on conductive pads on a printed circuit board, the acceptable tolerance would be a function of the placement required to ensure sufficient electrical contact between all of the leads in a device and all of the associated pads.

In order to be considered for membership in a set of co-linear features of the image, a group of three points or features, also can not have had correspondence to, i.e. been part of, a line already checked. The points/features of the image being checked by the co-linear feature finder, according to the invention, can only be a member of one feature set matching a model feature set.

When a group of three points meeting the co-linearity and frequency criteria is found, a line hypothesis has been established 34. All of the other image features are then tested for membership in this hypothetical line. Again, membership in the hypothesized line is based on the co-linearity and frequency of the image points or features, which criteria are based on the model features of interest. The testing of remaining image points for membership in the hypothesized line is iterated until a full image line or set is established. The full image line or set is established when the number of features determined to be members of the hypothesized line is greater than or equal to the number of features in the smallest set of the plurality of sets of features in the model. Features found in establishing the image line, which are in excess of the number of features in the smallest set of the plurality of sets of features in the model may be attributable to noise in the image. Moreover, features found which are in excess of the number of features in the smallest set of the plurality of sets of features in the model may be an indication that the hypothesized line corresponds, as described hereinafter, to a model line or set that has more features than the smallest model line or set.

If it is determined, upon testing all image features, that the hypothesized line formed by a group of three points does not have a number of features greater than or equal to the number of features in the smallest model set, then a new group of three points is used to form a hypothetical line (30), and all other image points are again tested for membership therein.

The selection of three image points, as opposed to some other number, as the starting point from which to start the line hypothesis testing according to the invention has certain associated advantages. First of all, if three image features are found at all which meet the co-linearity and frequency criteria, there is relatively high probability that they are associated with a co-linear feature set in the image. In contrast, if any 2 image features are found to meet the co-linearity and frequency criteria, they would by definition establish a line, however, the probability that the line would correspond to any line of features is significantly less than if three features satisfy the criteria.

Similarly, if the three points found to meet co-linearity and frequency criteria are from the same co-linear feature in accordance with the model, then the line established by the three points will be less affected by error in the image position related to any single one of the points. Thus the three points provide a more stable starting line hypothesis. By contrast, the position of a line generated by two points will be greatly affected by error in the position of those two points, to the extent that the line passing through them may not be close enough to other image features that may be part of the same image set or line creating problems in finding all points associated with the set.

Furthermore, the selection of three image points, as opposed to four or more image points as a starting hypothetical line, avoids a greater amount of processing to determine a hypothetical line. That is, the smaller the initial group of image points required for a line hypothesis, the fewer the iterations of processing necessary to find the plurality of points or features that meet the co-linearity criteria, the frequency criteria and which are not a member of a line already checked. Thus the selection of optimally three points as a group for starting a hypothetical line reduces the run time of the process.

The image line, i.e. position information for the features of the hypothesized image line started by the group of three points and determined to have a number of features greater than or equal to the number of features in the smallest model set, is passed out of the co-linear feature finder module 14 to a position hypothesis generator 16. The position hypothesis generator 16 effects a process wherein the image line is matched in seriatim to each set of the plurality of sets of co-linear model features that it might match. That is, the image line formed in the co-linear feature finder will properly match one set, but in determining such a match it may have to be tested against a number of the plurality of sets of co-linear model features. Thus it may ultimately be necessary to try to match the image line to each of the model sets in order to ultimately determine, in a verification step described hereinafter, which is the proper model set, i.e. effecting the proper positioning of the image relative to the model. Accordingly, a plurality of image line to model set matchings may be generated based on the number of potential matches between the image line and the plurality of model feature sets.

Figure 4:
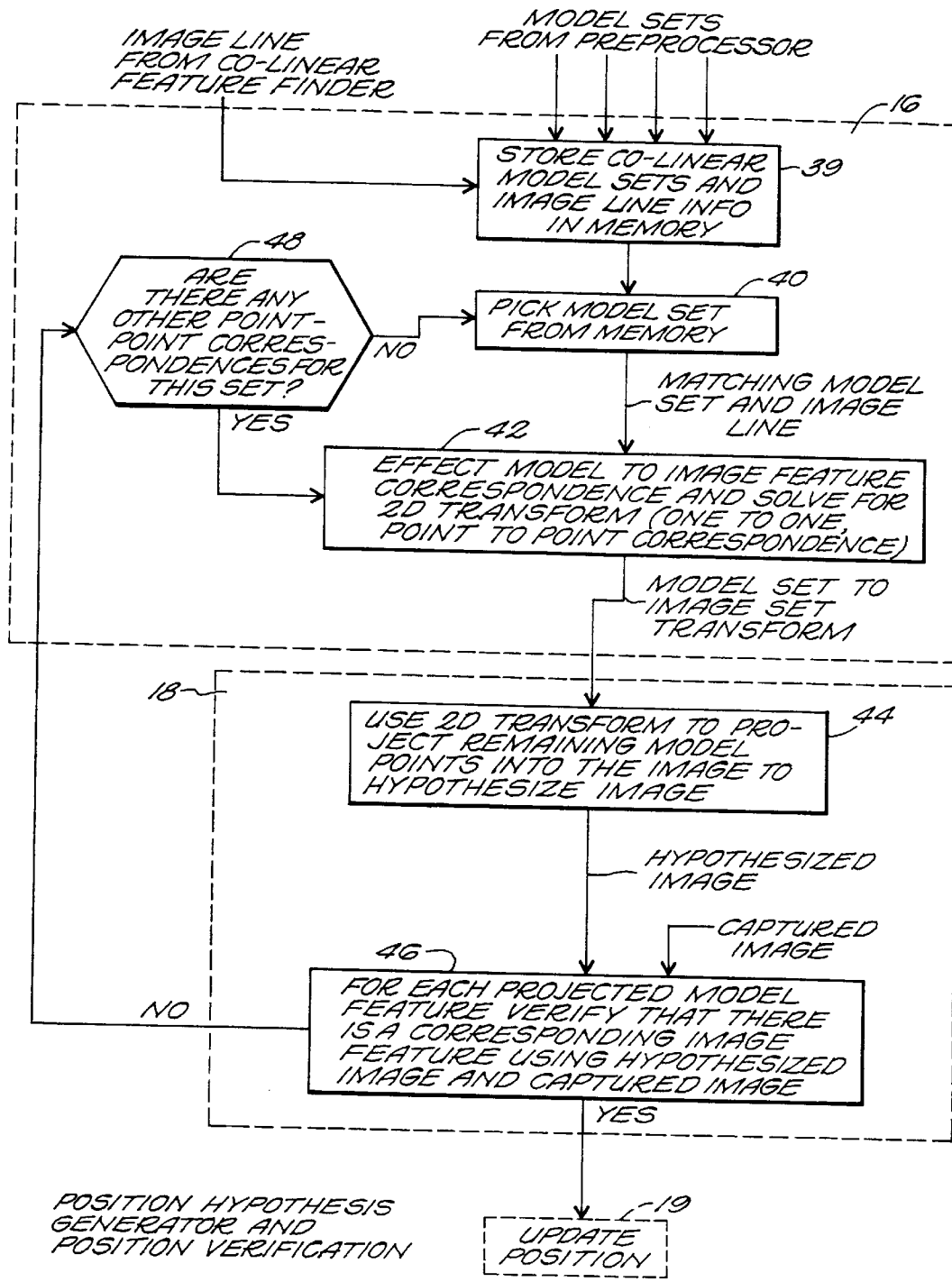
FIG. 4 is a block diagram of a position hypothesis generator and verification mechanism of the method and apparatus of FIG. 1.

The position hypothesis generator, illustrated in FIG. 4, receives, and stores in memory 39, the relevant co-linear model feature information from the model preprocessor (10, FIG. 1) and the image line information from the co-linear feature finder 14. One model set is initially chosen 40 (this can be an arbitrary choice) from the sets of co-linear model features in memory. An image line to model set matching is based on the selected model set and the line information. Generally, there are as many potential image line to model set matchings as there are sets in the plurality of co-linear feature sets in the model. The image line to model set matchings are used to generate a plurality of position hypotheses which represent the potential or hypothetical positioning(s) of the image line relative to model set features.

Figure 5:
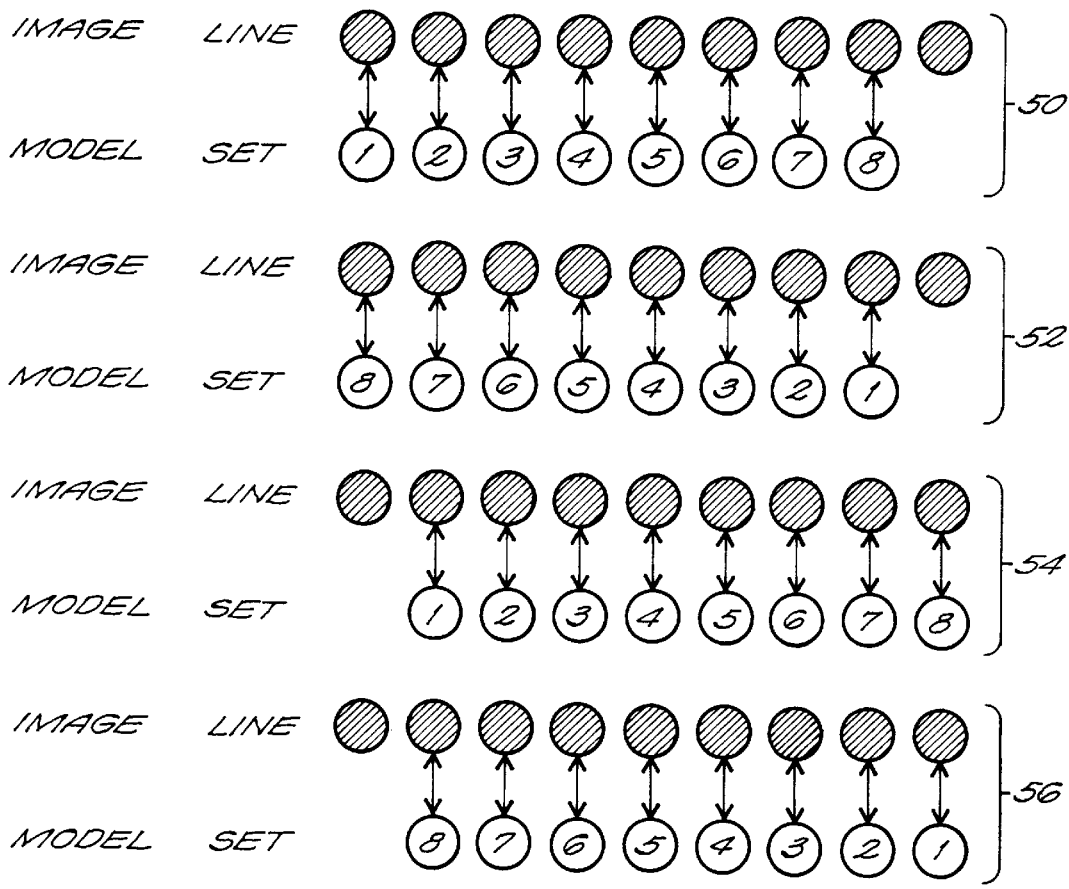
FIG. 5 is an illustration of position hypotheses generated by the position hypothesis generator of FIG. 4 with respect to a set of image features.

In generating the plurality of position hypotheses, the number of image features found in a line and the number of model features in a set determine the number of position hypotheses. In this illustrative implementation wherein the invention is described in the context of a pick and place machine including a vision system used in aligning an electronic component in physical space, the model is based on an illustrative electronic device. The electronic devise, for purposes of illustrating the invention, has four sides with eight leads on each of the four sides. For purposes of this illustration, the image line generated by the co-linear feature finder 14 includes nine features, one of which can be assumed to be erroneous or invalid, possibly resulting from noise in the image. Accordingly, as illustrated in FIG. 5, there are four position hypotheses, one of which represents the proper correspondence between the chosen model set and the image set or line.

Each position hypothesis represents a one-to-one correspondence between contiguous features in an image line and contiguous features in a model set. The model set features are used in both a forward direction (i.e. features 1–8) and a backward direction (i.e. features 8–1) in order to generate position hypotheses. Generally, for a particular plurality of co-linear model feature sets, there are 2(i–m+1) position hypothesis, where "i" is the number of features in an image set and "m" is the number of features in a model set.

In generating the position hypotheses, both the image line features and the co-linear model set features are sorted in order of position along their respective lines. In this illustrative implementation, a first position hypothesis 50 is formed by effecting a one-to-one correspondence between the first feature in the image line! and the first feature in the model set, and successively corresponding the remaining features thereafter. A second position hypothesis 52 is formed by effecting a one-to-one correspondence between the first feature in the image line and the last feature in the model set, and corresponding the remaining image line features in ascending order with the remaining model set features in descending order. Where there are a greater number of image features than model features, other position hypotheses 54, 56 are formed by incrementing (or decrementing) the position of the starting model set feature relative to the starting image line feature and effecting one-to-one correspondence of all remaining features in the forward and backward directions.

In the method and apparatus according to the invention, initially a first one-to-one, position hypothesis, image feature to model feature correspondence is formed based on an image line set to model set matching. Accordingly, as discussed, a plurality of one-to-one correspondences/position hypotheses may be generated which correlate model features to image features within their respective sets. For each position hypothesis, one-to-one correspondence, a 2D rigid transform is generated 42 which maps the model set chosen from the plurality of sets to the image set.

Each 2D rigid transform is calculated using a closed form equation, as known in the art, operating on translation, rotation and scale information defining the corresponding model and image features belonging to the two sets. Each position hypothesis defines a different 2D transform which is used to generate a hypothetical position image as described hereinafter.

Techniques to solve for 2D transforms, well known in the art, are routinely used in computer vision and robotics, and are described by Groen, Frans C. A., Sanderson, Arthur C., and Schlag, John F., in SYMBOLIC RECOGNITION IN ELECTRICAL DIAGRAMS USING PROBABALISTIC GRAPH MATCHING in the journal Pattern Recognition Letters, Vol. 3(5): 343–350, September 1985. Furthermore, mechanisms are known in the art of vision systems for use in solving for 2D transforms, such as in Cognex Fit Package of its SMD-PGP line of products.

Each position hypothesis is a one-to-one correspondence between image features and model features that can be used in checking the image against the model for proper correspondence between image features and model features. Each one-to-one correspondence developed in a position hypothesis yields an image position hypothesis that is processed to determine or verify the correct positioning of the image relative to the model.

As illustrated in FIG. 4, in a first iteration, a 2D rigid transform mapping the model set to the image set in accordance with the established one-to-one correspondence, i.e. providing transformation from model space to image space, is passed to a verification module (18, FIG. 1) which works in conjunction with the position hypothesis generator (16) to test for the proper one-to-one correspondence between the image and model. In the verification module (18), an hypothesized image is formed by using the 2D transform to project the remaining points or features into the image 44 (based on the respective position hypothesis one-to-one correspondence used to derive the model point to image point transformation 42). That is, the 2D transform for the particular position hypothesis is used to find hypothesized image feature locations for all remaining model points 44. The hypothesized image feature locations can then be tested or verified against the captured image, comprised of all points, to determine feature to feature correspondence in a position verification process (FIG. 1, 18).

It should be appreciated that in some cases, an object being inspected/manipulated according to the invention has features that are symmetrical and are to placed symmetrically about the objects X or Y axis, or both (as in the case of the device illustrated in FIGS. 6(a)–6(d) discussed hereinafter). When there is rotational symmetry of the device about a single axis, there are two different 2D transforms differing from each other by a rotation of 180 degrees, which give rise to the same hypothesized image. When there is two axis symmetry there are four transforms, differing from each other by a rotation of 90 degrees, which give rise to the same hypothesized image. In such cases, the verification mechanism 18 is configured to distinguish the correct 2D transform by verifying that the object rotation is consistent with a desired angular range. The range is specified as a parameter associated with the model cf the particular part. For example, to distinguish the correct transform when there is single axis symmetry, the range of rotation could not exceed 180 degrees (e.g. −90 to 90 or 0 to 180). Similarly, when there is double axis symmetry the range of rotation could not exceed 90 degrees.

During position verification (18), an hypothesized image related to a one-to-one position hypothesis correspondence is tested to see if it is correct 46. Generally, the hypothesized image including features or points projected into the image using the 2D transform 44 are processed to determine if there is a corresponding feature or point in the captured image. In the verification module 18 of this illustrative embodiment, a feature finding tool such as Cognex Caliper Tool or Blob Tool is applied, as known in the art, at each position in the hypothesized image implied by the found 2D transform or mapping to check that each image feature is actually there in correspondence with a model feature. Essentially, each model position is noted and the corresponding image feature is located in the image using the known vision tool. This verification approach has an advantage if a different vision tool is used other than that used to find the original set of co-linear image features in the co-linear feature finder, in that features found by two different vision tools are highly unlikely to have been the result of random image noise. Alternatively, verification can be effected by using the same vision tool as was used in the co-linear feature finder 14 to identify the image found in generating an image line. A still further alternative to verification may avoid using a vision tool, by merely searching the information generated in the image feature finder process (12, FIG. 1) for features that are close, within acceptable limits, to hypothesized image locations of model features.

Optionally, post verification position refinement, i.e. updating of the 2D transform 19, can be implemented after all of the model features are found in the image. For every model feature, the position of a corresponding image feature is noted during verification. With this information available for refinement 19, the 2D transformation which minimizes the sum of the squared distances between each corresponding model and image feature can be computed. The refined 2D transform can then be used to more accurately manipulate a component in physical space. Position updating or refinement 19 is desirable because the actual positions or locations of detected image features will likely be slightly displaced from their ideal locations due to noise arising from lens distortion in the vision system optics, lighting problems, discretization problems, or other problematic factors or combinations thereof. Thus, it is desirable to solve for the 2D transform which minimizes the sum squared error between all corresponding image and model points using the full sets of image to model feature correspondences. The overall position error of the component in image space can be minimized and the position of the component in physical space can be aligned accordingly to produce a more accurate result.

Referring still to FIG. 4, if all of the model features are not found in the captured image, the position hypothesis generator (16, FIG. 1) is invoked for another iteration to determine if there are any other one-to-one (i.e. point to point) correspondences 48 for this particular set and position hypothesis. If there are other one-to-one correspondences that have not already been processed, the one-to-one model feature to image feature correspondence for the position hypothesis is established and a corresponding 2D transform is generated and passed to the verification module (18, FIG. 1) for image hypothesis generation and testing as described hereinbefore. If there are no other one-to-one correspondences that have not already been processed 48, then another model set is picked 40 in a further iteration in order to establish a further model set and image set/line matching with which to establish further one-to-one model to image feature correspondences (position hypotheses) and 2D transforms 42 for further processing as described hereinbefore.

If there are no remaining model sets to match against the hypothesized line, this indicates that the image line was a result of random features in the image, rather than a co-linear model feature set. In this event, processing returns to the co-linear feature finder (FIG. 1, 14), which proceeds to find a different image line to input to the position hypothesis generator, illustrated in FIG. 4. Note that this event is highly unlikely; it will almost always be the case that processing will terminate with a correct correspondence after only a single pass through the co-linear feature finder processing.

In effect, a plurality of hypothesized images may be tested to verify the correct position hypothesis and one-to-one feature correspondence. For example, with respect to the illustrative application here(in, FIG. 6(a) and FIG. 6(b) illustrate two possible one-to-one correspondences between the image and model set based on a first position hypothesis (e.g. set position 1 of FIG. 5). However, in verification it will be determined that the set to set correspondence as illustrated in FIGS. 6(a) and 6(b) is incorrect as all features projected into the image do not correspond to model features (it should be noted that in FIGS. 6(a)–6(d) the individual feature to feature correspondence is shown in bold, image features are shaded and model features are unshaded). A second position hypothesis is illustrated in FIGS. 6(c) and 6(d), which show respective one-to-one correspondences yielding respective 2D transforms and hypothesized images. In FIG. 6(c) the correct set to set correspondence is illustrated, but there is incorrect image to model feature correspondence within the set as there is not a corresponding image feature for each model feature.

The correct one-to-one correspondence is that which leads to full correspondence, i.e. common location, between each hypothesized image feature and each model feature as established by the geometry of the model. Full correspondence is illustrated in FIG. 6(d) which shows the correct feature to feature correspondence within the correct set to set correspondence, i.e. the remaining model features projected to the correct locations in the image and all features of the model can be verified to be coincident with corresponding image features. With all of the model features found in the image, the correspondence of FIG. 6(d) can be verified as correct, then position updating can be implemented and the correspondence between the model features and the positions found by the tool in verification can be used to refine the final 2D transform in the position update step (19, FIG. 1) as described in detail hereinbefore.

Although the method and apparatus described herein includes a position hypothesis generator and verification mechanism wherein a particular one-to-one correspondence is used to find hypothesized image feature locations for all remaining model points, it should be appreciated that some number of features less than all or the total number of features in the model might be used to find a hypothesized image. Similarly, although as described herein, the hypothesized image feature locations are tested against the captured image, to determine feature to feature correspondence, it will be appreciated that some lesser number of points, i.e. other than all points, might be used to test the hypothesized image to determine feature to feature correspondence with the hypothesized image.

Although preprocessing in the illustrative embodiment described herein involves input of a geometric description, such as a file of ideal component characteristics provided by the component vendor, or empirically derived and entered such as by manually measuring the component characteristics of interest, those skilled in the art will appreciate that training in a system according to the invention can be alternatively effected using vision tools with training capabilities, such as Cognex Caliper, Search, Blob Analysis Tool or the like, which run on the vision system used in the illustrative application. Accordingly, an image can be captured and optimized, such as by filtering, and a model comprised of co-linear features can be constructed from the filtered or optimized image using such vision tools known in the art.

While the model is preprocessed in this illustrative embodiment to construct the data structure identifying all sets of co-linear model features and their respective characteristics based on sets of co-linear leads and each set's reference is at the center of the lead set and the Y-axis of the reference frame radiates outwardly from the center of the part, it will be appreciated that model feature sets can be based on other than lead sets. For instance, a feature set can be based on a plurality of package corners of a part or corner pairs, and the reference frame can be alternatively defined as a function of the particular feature set(s).

Similarly, various alternative feature finders can be implemented to find features and generate feature data corresponding to features in the image consistent with the model feature set data structure. If the model feature data structure defined includes geometric features a feature finder such as Cognex Blob Tool can be used as a feature finder to find the center of an area of an appropriate size as is consistent with the model feature set. Cognex Search Tool can be implemented as a feature finder to find a particular pixel pattern as is consistent with the model feature set, or other feature finders, as known in the art, can be used as a function of the features such as a Hough circle finder to find angular features or a corner finder to find corners.

While the method and apparatus according to the invention is described here:-n are described as mechanisms implemented in the context of a pick and place apparatus which manipulates electronic devices, it will be appreciated that the mechanisms according to the invention can be implemented in contexts other than pick and place machinery, including but not limited to other forms of machinery for manipulating and/or inspecting objects.

Furthermore, while the method and apparatus according to the invention described herein are described as mechanisms implemented in a machine vision system including vision tools, such as Cognex vision systems and tools, it will be appreciated by those skilled in the art that all of the mechanisms can be implemented in software and executed on a general purpose computer or microprocessor. Alternatively, one or more modules can be implemented as a specialized computational element in cooperation with other specialized hardware and/or software for implementing the functionality of the mechanisms described.

Although the invention has been shown and described with respect to exemplary embodiments thereof, various other changes, omissions and additions in the form and detail thereof may be made therein without departing from the spirit and scope of the invention.

What is claimed is:

1. A method for locating an object in physical space and manipulating said object based on an image of said object acquired in accordance with image space, said method comprising the steps of:

preprocessing a model of said object by defining co-linear features of said model in accordance with model space, and identifying at least one model set of co-linear feature information;

implementing an image feature finder to find a plurality of features, in image space in a captured image of said object, said plurality of features being substantially similar in character to co-linear features defined in said model during preprocessing;

configuring a co-linear feature finder to receive from said image feature finder point information related to said plurality of features in said captured image and to test said plurality of features for co-linearity and frequency to form a hypothesized line comprised of a first plurality of features;

testing remaining image point information, other than said point information related to said plurality of features forming said hypothesized line, for membership in said hypothesized line until full image line feature information is established;

processing said full image line feature information and said at least one model set of co-linear feature information to generate at least one two dimensional transform mapping said full image line feature information in image space to said at least one model set of co-linear feature information in model space and providing a direct mapping of image space to model space;

using said at least one two dimensional transform to form a hypothesized image including said full image line feature information and projected feature information solved with said direct mapping of image space to model space; and verifying said hypothesized image against said captured image to determine if each feature is in said captured image and in its proper location.

2. The method of claim 1 wherein said model is a known good or standard representation of said object and said preprocessing step involves constructing a data structure of defined co-linear features, of said model, in model space.

3. The method of claim 1 wherein said preprocessing step involves constructing a data structure of a known good or standard representation of said object to be processed in model space and said data structure includes model characteristics derived from geometric definitions describing features of interest of said model.

4. The method of claim 1 wherein said preprocessing step involves constructing a model data structure including a unique identifier for each of a respective set of co-linear features, and for each said respective set of co-linear features storing in said model data structure characteristics of interest, including a number of features in said set, a spacing between contiguous features in said set, and a location or position of said respective set with respect to a model reference frame.

5. The method of claim 4 wherein said location or position stored in said model data structure is a two dimensional transform relating a set reference frame of said respective set of co-linear features to said model reference frame.

6. The method of claim 5 wherein said two dimensional transform relating said set reference frame of said respective set of co-linear features to said model reference frame includes an X translation coordinate, a Y translation coordinate, and a rotation angle between X axes of said set reference frame and said model reference frame.

7. The method of claim 1 wherein said co-linear feature finder is configured to find all groups of three features and said groups are formed by executing an exhaustive loop which processes all features to form said groups of three features.

8. The method of claim 1 wherein said first plurality of features forming said hypothesized line equals three features.

9. The method of claim 1 wherein said co-linear feature finder is configured to find all groups of three features and said groups of three features are processed by said co-linear feature finder to determine whether they meet co-linearity and frequency criteria based on model features of interest.

10. The method of claim 7 wherein said co-linear feature finder is configured to find all groups of three features and wherein each group of three co-linear features is tested for co-linearity, where co-linearity is determined based on a least squared line along which each feature in said group of three features fits wherein the maximum deviation permissible for a features to fit a line is a function of dimensions of model features of interest.

11. The method of claim 7 wherein said co-linear feature finder is configured to find all groups of three features and wherein each group of three features is tested for frequency, where frequency is defined as spacing between contiguous model features as a function of geometry of said model.

12. The method of claim 1 wherein said full image line is established when a number of features determined to be members of said hypothesized line is greater than or equal to a number of features in a smallest set of a plurality of sets of co-linear features in said model.

13. The method of claim 1 wherein said step of testing remaining image point information involves testing said remaining image point information for co-linearity and frequency in accordance with said first plurality of features of said hypothesized line.

14. The method of claim 1, further including a step of refining position information of features in said hypothesized image to ensure optimal positioning of said features in said hypothesized image based on information from said captured image.

15. The method of claim 14 wherein said step of refining involves updating said at least one two dimensional transform by computing a refined transform which minimizes a sum of squared distances between each corresponding model feature and image feature.

16. The method of claim 1, wherein said step of processing said full image line feature information and said at least one model set of co-linear feature information to generate at least one two dimensional transform mapping said full image line feature information in image space to said at least one model set of co-linear feature information in model space involves steps of:

sorting features comprising said full image line feature information in order of relative position along said hypothesized line to form ordered image line features;

sorting co-linear model features comprising said at least one model set of co-linear feature information in order of relative set position to form ordered model set features;

generating a first position hypothesis by effecting a one-to-one correspondence between a first feature in said ordered image line features and a first feature in said ordered model set features, and successively corresponding remaining features in each of said ordered image line features and said ordered model set features;

generating a second position hypothesis by effecting a one-to-one correspondence between a first feature in said ordered image line features and a last feature in said ordered model set features, and successively corresponding remaining features in each of said ordered image line features and said ordered model set features; and generating said at least one two dimensional transform from said first position hypothesis and said second position hypothesis.

17. The method of claim 16 wherein other position hypotheses are formed by one cf incrementing or decrementing a position of said first feature in said ordered image line features relative to said first feature in said ordered model set features, and successively corresponding remaining features in each of said ordered image line features and said ordered model set features effecting one-to-one correspondence of all remaining features in forward and backward directions, and generating said at least one two dimensional transform from said other position hypotheses.

18. An apparatus for inspecting and locating a two dimensional representation of an object within a captured image, comprising:

an image feature finder configured to find a plurality of features, in image space in said captured image of said object, each of said plurality of features being substantially similar in character to features in at least one model set of co-linear features present in a model of said object in accordance with model space;

a co-linear feature finder configured to receive from said image feature finder point information related to said plurality of features in said captured image and to test said plurality of features for co-linearity and frequency, said co-linear feature finder configured to form a hypothesized line comprised of a first plurality of features and to identify all features belonging to said hypothesized line in order to obtain full image line feature information;

a position hypothesis generator configured to receive said full image line feature information from said co-linear feature finder and said at least one model set of co-linear feature information, and to generate at least one two dimensional transform mapping said full image line feature information in image space to said at least one model set of co-linear feature information in model space effecting a direct mapping of image space to model space;

a verification processor configured to receive said at least one two dimensional transform from said position hypothesis generator and to form a hypothesized image including said full image line feature information and projected feature information solved with said direct mapping of image space to model space, said verification processor being further configured to verify said hypothesized image against said captured image to determine if each feature is in said captured image and in its proper location.

19. The apparatus of claim 18 further including a preprocessor configured to preprocess said model of said object by defining co-linear features of said model in accordance with model space, and to identify at least one model set of co-linear feature information to pass to said position hypothesis generator.

20. The apparatus of claim 19 wherein said preprocessor is configured to constructing a data structure of co-linear features of said model, in model space, said data structure including model characteristics derived from geometric definitions describing features of interest of said model and including a unique identifier for each of a respective set of co-linear features, and for each said respective set of co-linear features, a number of features in said set, a spacing between contiguous features in said set, and a location or position of said respective set with respect to a model reference frame, said location or position being a two dimensional transform relating a set reference frame of said respective set of co-linear features to said model reference frame and having an X translation coordinate, a Y translation coordinate, and a rotation angle between X axes of said set reference frame and said model reference frame.

21. The apparatus of claim 18 wherein said co-linear feature finder is configured to test remaining image point information, other than said point information related to said plurality of features forming said hypothesized line, for membership in said hypothesized line until full image line feature information is established.

22. The apparatus of claim 18 wherein said co-linear feature finder is configured to find all groups of three features and said groups are formed by executing an exhaustive loop which processes all features to form said groups of three features.

23. The apparatus of claim 18 wherein said first plurality of features forming said hypothesized line equals three features.

24. The apparatus of claim 18 wherein said co-linear feature finder is configured to find all groups of three features and said groups of three features are processed by said co-linear feature finder to determine whether they meet co-linearity and frequency criteria based on model features of interest.

25. The apparatus of claim 18 wherein a vision system is implemented incorporating said image feature finder, said co-linear feature finder, said position hypothesis generator and said verification processor, in a mechanism for picking and placing electronic components on a printed circuit board.

* * * * *